United States Patent [19]
Prendergast

[11] Patent Number: 5,873,731
[45] Date of Patent: Feb. 23, 1999

[54] PATIENT DRUG RECOGNITION SYSTEM

[75] Inventor: William K. Prendergast, Kirkwood, N.Y.

[73] Assignee: Eagle Simulation, Inc., Binghamton, N.Y.

[21] Appl. No.: 731,664

[22] Filed: Oct. 17, 1996

Related U.S. Application Data

[60] Provisional application No. 60/005,718 Oct. 20, 1995.

[51] Int. Cl.[6] .............................. G09B 23/28; A61N 1/30
[52] U.S. Cl. ............................................... 434/262; 604/19
[58] Field of Search .................................. 604/19, 21, 80, 604/85; 434/262; 73/53.01, 61.41, 61.43, 61.56, 61.58, 61.61, 861.03

[56] References Cited

U.S. PATENT DOCUMENTS

| | | | |
|---|---|---|---|
| 4,838,857 | 6/1989 | Strowe et al. | 604/67 |
| 4,853,521 | 8/1989 | Claeys et al. | 235/375 |
| 5,100,380 | 3/1992 | Epstein et al. | 604/67 |
| 5,317,506 | 5/1994 | Coutre et al. | 604/65 |
| 5,403,192 | 4/1995 | Kleinwaks et al. | 434/272 |
| 5,609,575 | 3/1997 | Larson et al. | 604/65 |

Primary Examiner—Robert A. Hafer
Assistant Examiner—John Edmund Roynak
Attorney, Agent, or Firm—Malin, Haley, DiMaggio & Crosby, P.A.

[57] ABSTRACT

A drug recognition system for patient simulators is provided for use in training in anesthesiology, operating rooms, and emergency rooms. In a patient simulator mannequin, simulated intravenous drugs are administered by syringe. Each syringe used on a multiple syringe manifold contains a simulated drug fluid and an integrated circuit preprogrammed with a drug type and concentration. A flow sensor provides the amount of simulated drug administered. A computer senses the drug type and concentration from the integrated circuit attached to the syringe, and measures the amount administered from the flow sensor. The drug type, concentration, and amount administered is used by the computer, along with other measured parameters, body and drug models, and trainer input, to cause the simulator mannequin to react in the proper or desired manner. In an alternate embodiment, the system can be used to record the type, concentration, and amount of actual drugs administered to a real patient. In an alternate embodiment, the system can be used in conjunction with a device to automatically administer drugs to a real patient under the control of a computer using adaptive body and drug models initially under the control of a physician.

15 Claims, 8 Drawing Sheets

PATIENT DRUG RECOGNITION SYSTEM

This application claims the benefit of U.S. provisional application No. 60/005,718, filed Oct. 20, 1995.

BACKGROUND OF THE INVENTION

1. Field of the Invention

This invention relates to drug administration in a patient and patient simulator mannequin for use in training physicians and other medical personnel in anesthesiology and emergency room procedures, and recording actual drugs administered to a patient, and in particular to a patient and patient simulator drug recognition system that identifies the type, concentration, and amount of simulated drug being administered to the patient mannequin, or the type, concentration, and amount of actual drug being administered to the patient.

2. Description of Related Art

Almost all training of anesthesiologists has been by having the student doctor observe numerous actual patients being anesthetized by one or more skilled anesthesiologists. The anesthesiologist must remain present during the patient treatment or operation for the entire period that the patient is being anesthetized. Thus, in the training cycle, typically, the students will also be required to spend several hours as observers. Such a training procedure is extremely costly, and provides little guarantee that every student will be able to observe all possible emergency problems that can arise during the time period that the patient is anesthetized. Obviously, during an actual patient operation, there is no opportunity to practice typical or even unexpected emergencies that could happen during the actual process.

There are presently available patient simulator mannequins to train medical personnel in anesthesiology and emergency room medicine. These mannequins may have capabilities featuring spontaneous breathing and mechanical ventilation, thumb twitch in response to nerve stimulus, heart and breath sounds, pulses, and a complete airway anatomy for intubation and difficult airway training. Examples of anesthesiology simulator mannequins are disclosed in U.S. Pat. No. 5,403,192 issued to Kleinwaks et al., the disclosure of which is incorporated herein by reference.

Using patient simulator mannequins, the student can develop skills in manual dexterity and diagnosis, recognize symptoms immediately, prescribe the right remedy, and correct the patient's condition, with none of the inherent risk to a real patient.

Mannequins are particularly important for training in crisis management of critical events that happen rarely, especially in anesthesiology. The mannequins are typically computer controlled and can be programmed for a variety of responses which simulate a variety of problems.

A student doctor undergoing anesthesiology training in a simulator will see a mannequin representing the patient, and can utilize required anesthesia equipment such as ventilators exactly like the equipment found in any operating room. He or she can ventilate the simulator's mannequin by mask, or the trachea can be intubated. When connected to an anesthesia gas machine, anesthetic gases and air or oxygen will be delivered to the mannequin, which, under computer control, will return gases containing the appropriate amount of carbon dioxide. The trainee is observed by another anesthesiologist acting as an instructor, who will enter certain information about these observations into the computer.

For enhanced realistic training, the present invention allows the trainee to administer intravenous (IV) injections of simulated drugs to the mannequin, and these simulated drugs will be monitored and registered in accordance with the invention described herein.

Monitors and instruments will be driven in some cases by the gases exhaled by the mannequin, and in other cases by the computer through output equipment or "linkage" (interface circuitry). The trainee may apply a nerve stimulator to the mannequin, which will respond accordingly; the mannequin will also exhibit a number of other relevant clinical signs, for example breath sounds or heart sounds audible with a stethoscope. Through these simulated human responses, and through the use of mathematical models of internal body processes, the computer and mannequin can simulate the condition of a human patient who has been subjected to the anesthetics and other drugs given to the mannequin.

An anesthesiology simulator product may contain, and is organized around, a list of the following mannequin and associated components parts:

Dummies (mannequins) for training in the insertion of tubes directly into the trachea or windpipe ("endotracheal intubation") for the administration of anesthetics are commercially available; they are plastic models which are anatomically correct throughout the mouth, throat, larynx, trachea, esophagus, and bronchial tubes. For the anesthesiology trainer described herein, the mannequin will also have the following added capabilities:

"Lungs," which can ventilate spontaneously as well as passively through hand ventilation or a mechanical ventilator. The lungs will be made to inflate spontaneously through the movement of a bellows (actuated from the computer). The spontaneous inflation of the bellows can be turned off, in which case any ventilation will be that induced through hand ventilation or mechanical ventilation.

Speakers, providing heart sounds that can be detected with a stethoscope. These sounds will be modified according to the calculated heart rate. Selection of sounds will reflect various heart conditions as determined by math models.

Devices in the mainstem bronchi are employed which can be caused to block a bronchus, thus simulating the inability of the associated lung to receive delivered gas.

Palpable pulses, at both the carotid artery and the radial artery can be generated.

As over 70 different types of drugs can be used in actual anesthesiology, a system to determine the type, concentration, and amount of drug administered to the mannequin patient is needed for proper and more realistic patient simulator training.

An extremely important aspect of anesthetizing a patient in a conventional operating room setting is the requirement that the patient receive fluids and drugs through IV devices. Typically, an IV fluid bag is connected to a patient, usually in the arm of the patient. The fluid bag is connected to an injection port manifold, where the contents of several different syringes can be individually and independently added into the fluid flow prior to entering the patient. Immediate IV access to the patient can be critical during an emergency situation for administering a necessary drug quickly. Critical to the well being of the patient, obviously, is to ensure that the proper fluids or drugs are given to the patient in the anesthesiology and operating room environment.

Therefore, for anesthesiology simulation, and in particular the patient simulator, it is important to train and simulate drug administration and registration and to know the type of each drug being injected into the patient, as well as the amount for training evaluation. In the case of a simulator, the simulated patient is a mannequin that can include a mannequin arm simulating a human arm, an IV bag, an injection port manifold for the distribution of real liquids, such as water, that simulate the liquid flow of certain drugs, each having port openings that can be connected to syringes for simulated injection of drugs into the mannequin patient. It is also important that the drug recognition equipment be as "invisible" as possible in the simulated operating room environment to minimize the amount of equipment that would not be present in the actual operating room. In training and simulation, it is also desirous not to add any specific operational steps to the act of injecting the drugs, other than those that would normally be performed on a typical patient in an operating room.

In accordance with the invention described herein, a system is provided for drug recognition for manual delivery by the trainee of simulated drugs into one or more places, typically in the mannequin's arm, into which intravenous (IV) simulated fluids and drugs can be inserted to enhance realism and training.

In addition, in real operating and emergency rooms there exists a need for a system to automatically record the type of drug, concentration, and quantity administered, and the time of administration to the patient.

SUMMARY OF THE INVENTION

The present invention provides, for simulation and training purposes, an automatic drug recognition system to meet the training requirements that automatically reads a digitally encoded syringe that is manually attached by the trainee to an IV port manifold to obtain the drug type and concentration, and also that may include measuring the amount of flow of liquid from the syringe into the port manifold to measure the amount of fluid transferred into each port in the manifold.

The present invention is comprised generally of a donut-shaped, rigid, non-conductive body or housing that has embedded therein a memory chip that is preprogrammed to provide digital information to a computer that would be recognized as identifying a specific drug or other type of information as desired. The nonconductive, donut-shaped ring has an interior annular diameter sized to fit snugly around the base of a simulated syringe so as to be unobtrusively attached thereto without impeding the manual function of operating the syringe, which includes ejection of a fluid within the syringe manually by depressing an arm that pushes a piston inside the syringe to evacuate fluid therein. The donut-shaped annular housing has disposed adjacent one lower face conductive rings that are electrically and conductively attached to the memory chip that is embedded in the annular housing. The conductive rings will be facing outward toward the evacuation nozzle of the syringe.

The intravenous tube includes one or more injection ports for receiving the nozzle of each syringe that provides rapid access into the intravenous tube to allow administration manually of a simulated particular drug into the intravenous tube which is directed into the patient's arm, or the simulated arm in this case. Each input injection port, which is a cylindrical tube, has a circumferential housing disposed around the tube that includes a pair of electrical spring-actuated contacts which are sized and shaped and spaced relative to the diameter of the injection port to contact the conductive rings on the annular housing surrounding the syringe nozzle when the syringe is manually placed in physical contact, connecting it with the injection port. The electrical contacts, which are housed around the injection port input, are connected electrically to a computer to provide digital signals to the computer from the memory chip which downloads data to the computer to identify a predetermined simulated drug on the computer.

The drug identification system may also include a device for measuring the proper quantity or volume of fluid provided to the patient which is also a critical parameter, especially in an emergency. It is imperative that the trainee not only know what drug to administer, but the proper quantities based on a particular patient and the problem at hand. Therefore, in addition to the recognition identification memory chip and conductive rings, the injection port could include inlet and outlet conduits which lead to a flowmeter that are directly in fluid communication with the output of the syringe nozzle when it is in the injection position, during which fluid is injected by manually depressing the piston in the syringe. Fluid flowing through a flowmeter will also be monitored through an electrical device that is connected to the same computer to measure not only the type of drug being simulated, but also the actual volume of fluid administered.

To operate the device, the simulated mannequin patient includes an IV bag having a simulated fluid therein and an IV tube which is connected directly into the mannequin's arm and could include a collecting container to receive these fluids. During the anesthesiology procedure or emergency room procedure, should an emergency situation arise, or as part of the correct medical procedure, the trainee will select a syringe containing a pre-identified drug that agrees or corresponds to the memory chip data and will manually inject the syringe nozzle into the input port which is connected to the IV tube adjacent the mannequin. The computer will then apply the administered drug, concentration, and quantity to affect the computer's model of the patient physiology as well as log the injection data for review purposes.

In an alternate embodiment, the present invention is utilized in an actual operating or emergency room to identify the type of drug, concentration, and quantity administered, and to log this data along with the time the drug was administered to a patient.

In accordance with these and other objects which will become apparent hereinafter, the instant invention will now be described with particular reference to the accompanying drawings.

DESCRIPTION OF THE PREFERRED EMBODIMENTS

Figure 1:
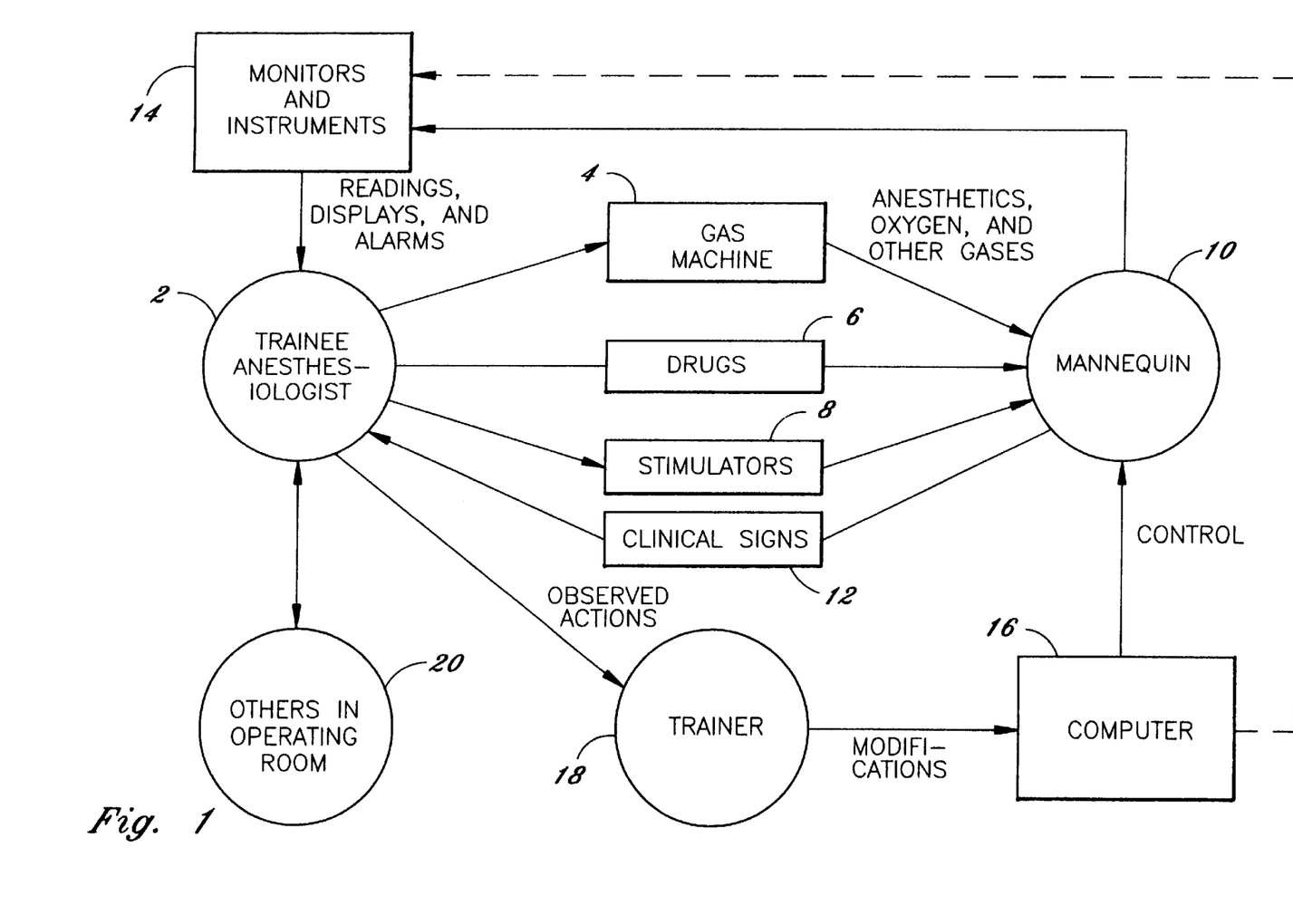
FIG. 1 is a schematic diagram of an anesthesiology training system with a simulator mannequin using the present invention.

Referring now to FIG. 1, a system for anesthesiology training including a simulated patient mannequin is shown using the present invention. The trainee anesthesiologist 2 manually administers gases such as air or oxygen, and other gases 4, drugs 6, and simulators 8 to the simulator mannequin 10. The mannequin 10 provides clinical signs 12 to the trainee 2 and to instruments and displays 14 which trainee 2 monitors. Mannequin 10 is controlled by computer 16, and responds as a real patient should respond to the various inputs received from trainee 2. Computer 16 also provides input to instruments and displays 14 to simulate any clinical responses that mannequin 10 does not provide, such as body temperature and electrocardiograph.

The computer is under control of a supervising person that controls the simulated operation regarding anesthesiology or emergency room procedures shown as trainer 18. Trainer 18 observes trainee 2 and can modify the mannequin control computer 16, causing mannequin 2 to react in desirable manners which mimic real patients. Trainer 18 can thus cause mannequin 10 to simulate various emergency reactions and life threatening situations. Additional personnel 20, such as other emergency or operating room staff, can also monitor or provide input to the trainee, to further simulate a real life situation. The present invention is utilized in the administration of drugs 6, as will be described in detail below.

Figure 2A:
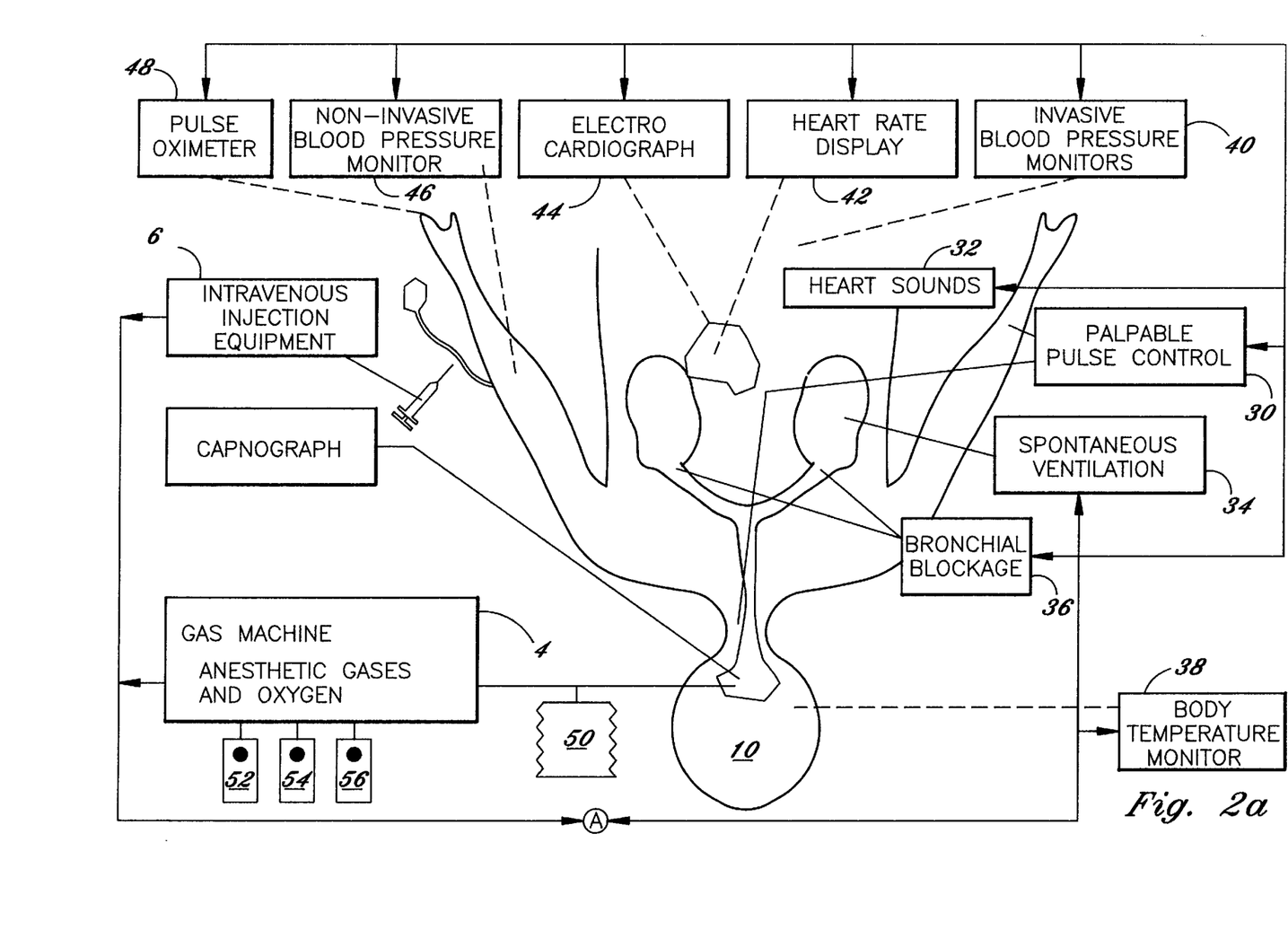
FIGS. 2a and 2b are schematic diagrams of an anesthesiology simulator mannequin using the present invention.
Figure 2B:
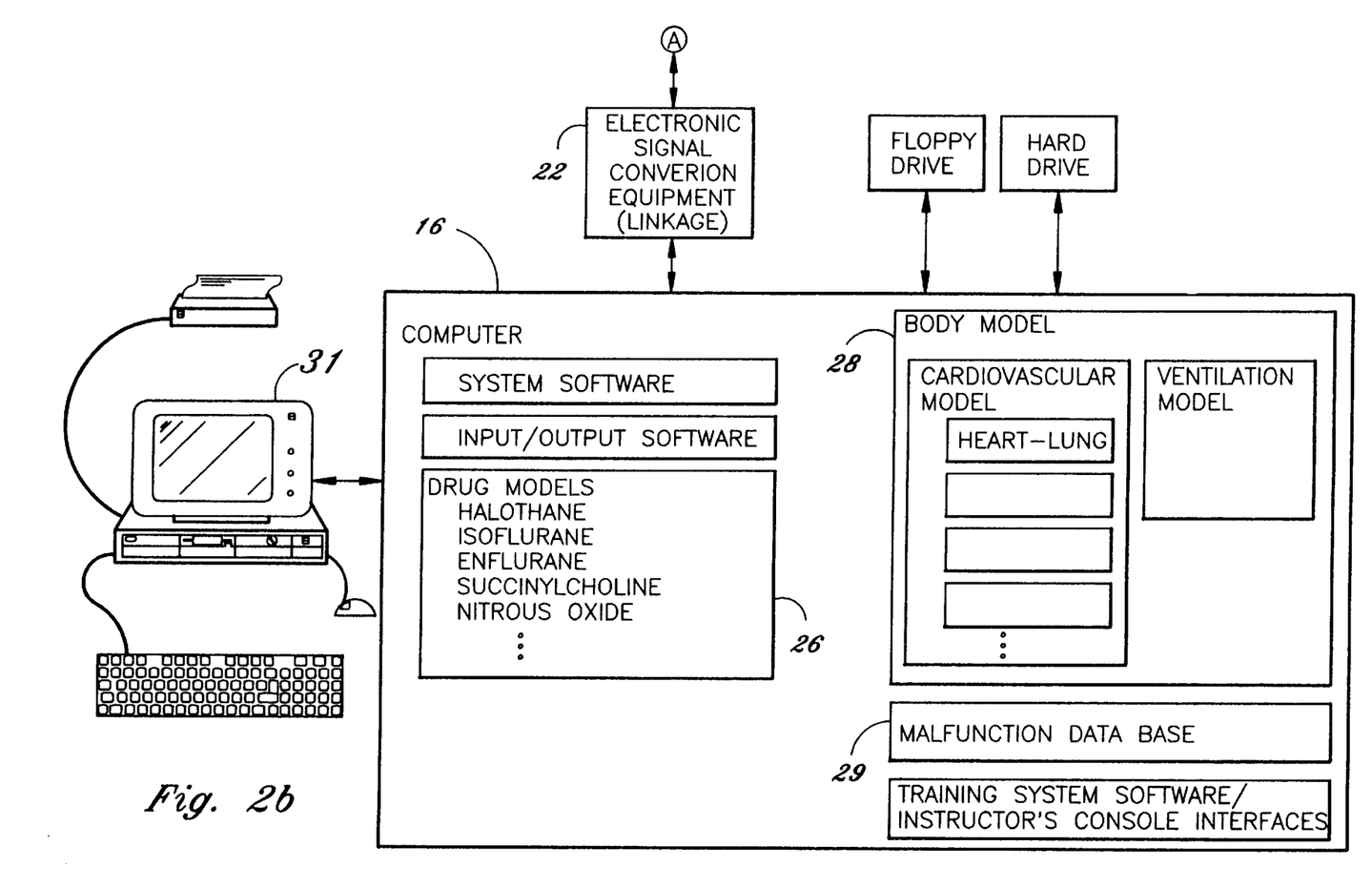

Referring now to FIGS. 2a and 2b, intravenous drug injection equipment 6 is monitored as to type of drug, concentration, and amount by computer 16 through computer interface circuitry or linkage 22. Computer 16 also monitors other parameters such as gases being administered 4. Computer 16 can be any suitable computer, such as personal computer 31, which provides for trainer 18 input and control, and other data logging and/or analysis functions. Alternately, depending on processing power and speed, multiple computers can be utilized. Computer 16 and personal computer 31, for example, could be separate computers with computer 16 performing simulator monitoring and control functions, and computer 31 providing for trainer 18 input, data logging, printing, diagnostic and other functions.

Computer 16 utilizes all monitored parameters, drug models 26, physiological or body models 28, malfunction data base 29, and input from the trainer's console 31, to cause various clinical responses in mannequin 10. The range of responses includes palpable pulse control 30, heart sounds 32, spontaneous ventilation 34, and bronchial blockage 36. Computer 16 also provides displays or instrument input for body temperature 38, invasive blood pressure monitors 40, heart rate display 42, electrocardiograph 44, non-invasive blood pressure monitors 46, and pulse oximeter 48.

Bronchial blockage 36 can be used to block a bronchus thus simulating the inability of the associated lung to receive delivered gas.

Gas machine 4 can be used to administer any gas medically delivered, and includes gases such as nitrous oxide 52, oxygen 54, and air 56.

Intravenous drug injection equipment 6 are monitored as to type of drug administered, quantity, and concentration as described in detail herein below. The specific drug administered concentration, and amount administered are used in combination with all other measured parameters, along with input from the trainer 18, and computer drug models 26 and body models 28 to provide real life responses in mannequin 10.

Figures 3, 4:
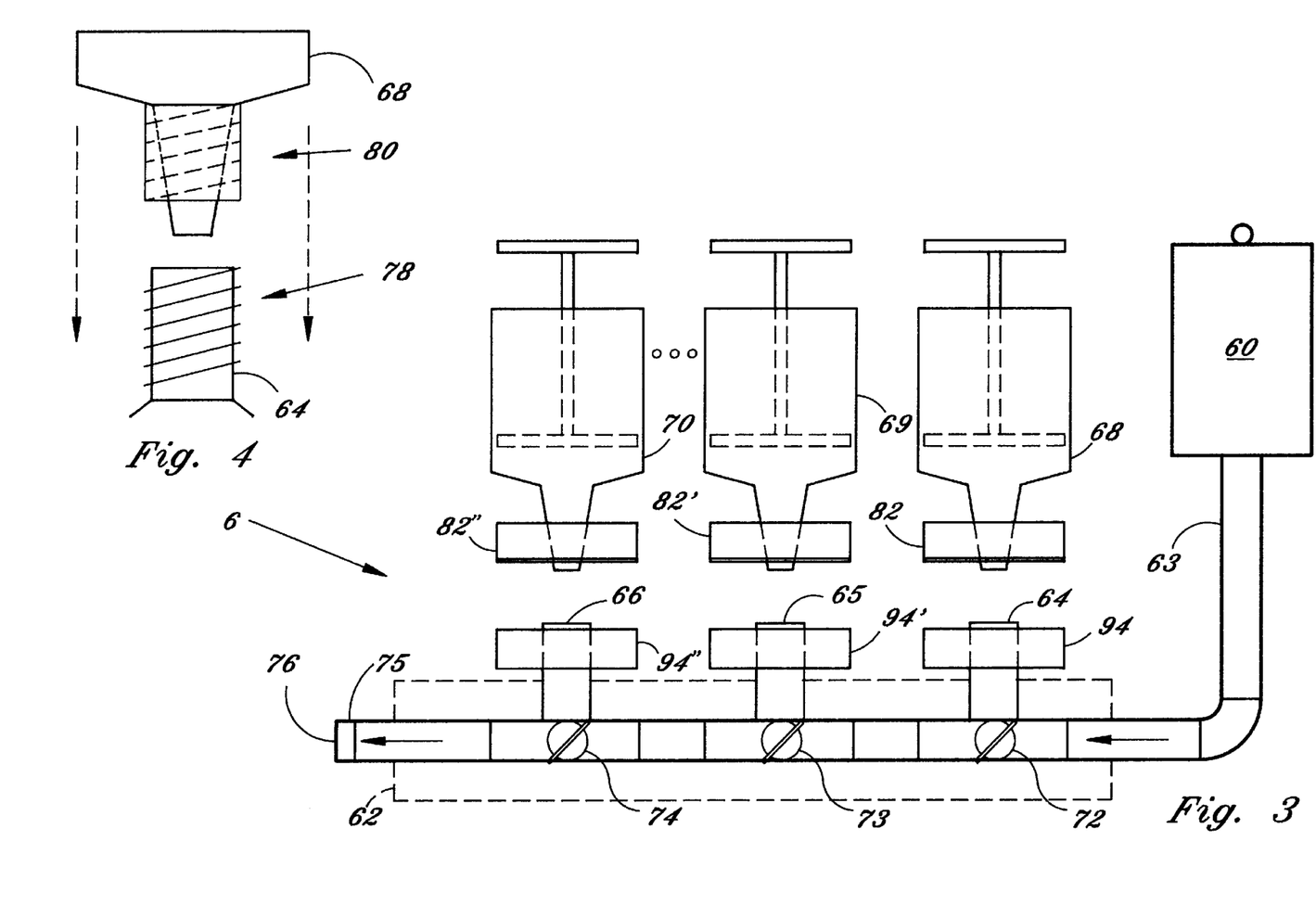
FIG. 3 is a schematic diagram of the port manifold of the present invention.
FIG. 4 is a front elevational view of the syringe connection to the injection port of the present invention.

Referring now to FIG. 3, an example of simulated intravenous (IV) drug injection equipment 6 is shown comprising IV bag 60, port manifold 62, and IV line 63. Port manifold 62 is shown, by example only, as having three possible syringe port connections 64, 65, and 66. Each syringe 68, 69, and 70, partially shown as a cutaway of the end of the syringe, connects to three port openings 64, 65, and 66, respectively, which include manually actuated on and off valves 72, 73, and 74, one connected to each port opening 64, 65, and 66, with the manifold 63 being connected to the simulated patient's IV at 76.

Typically, each syringe 68, 69, and 70 is connected to one of the IV ports 64, 65, and 66 on manifold 62 and twist-locked into place as shown in FIG. 4. Using syringe 68 and port 64 as example, threaded fasteners, one threaded on the injection port 78 and one on the end of the syringe 80, allows syringe 68 to be connected directly into the injection port 64 by screw threads 78 and 80 that are twist-locked into place.

Figure 5:
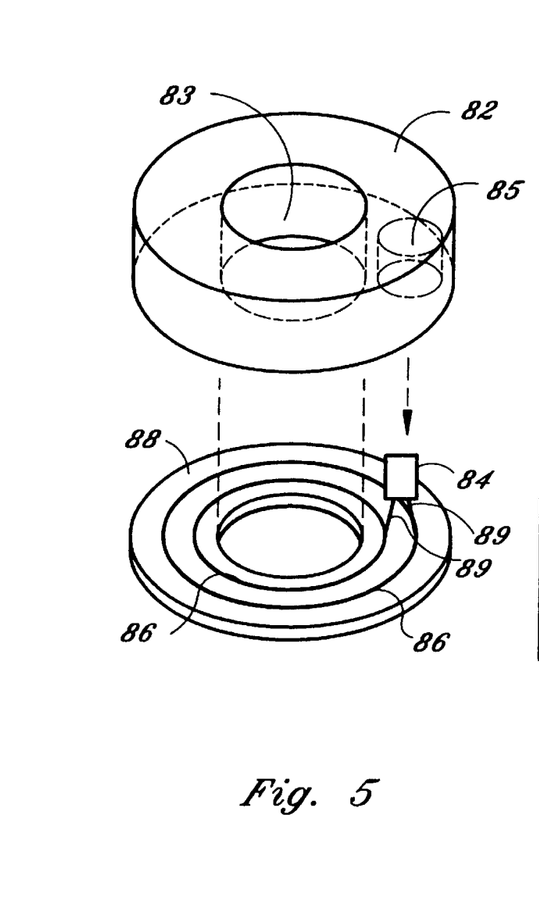
FIG. 5 is an exploded perspective view of a portion of the syringe identification disk of the present invention.

Referring now to FIG. 5, the syringe identification (drug and concentration) is accomplished using a small identification (ID) disk 82 that is attached to and mounted around a standard syringe through aperture 83. Embedded in the disk 82 in hollow portion 85 is an integrated circuit 84 that maintains contact with concentric contact rings 86 located in disk base 88. Integrated circuit (IC) 84 is any suitable IC that performs memory functions, such as Read-Only Memory (ROM), Electrically Erasable Programmable ROM (EEPROM), or RAM. Suitable IC chips can be purchased from Dallas Semi-Conductor, Inc.

IC chip 84 is unique in that the power to read the chip is obtained from the reader (computer 16 shown in FIG. 2b) and transfers all its memory data over two leads (wires) 89 such that no additional support circuitry is required. Other methods can be used such as the TIRIS™ system from Texas Instruments, Inc., which performs a similar function using a radio transponder that would be embedded into the syringe (not shown).

Figures 6A, 6B:
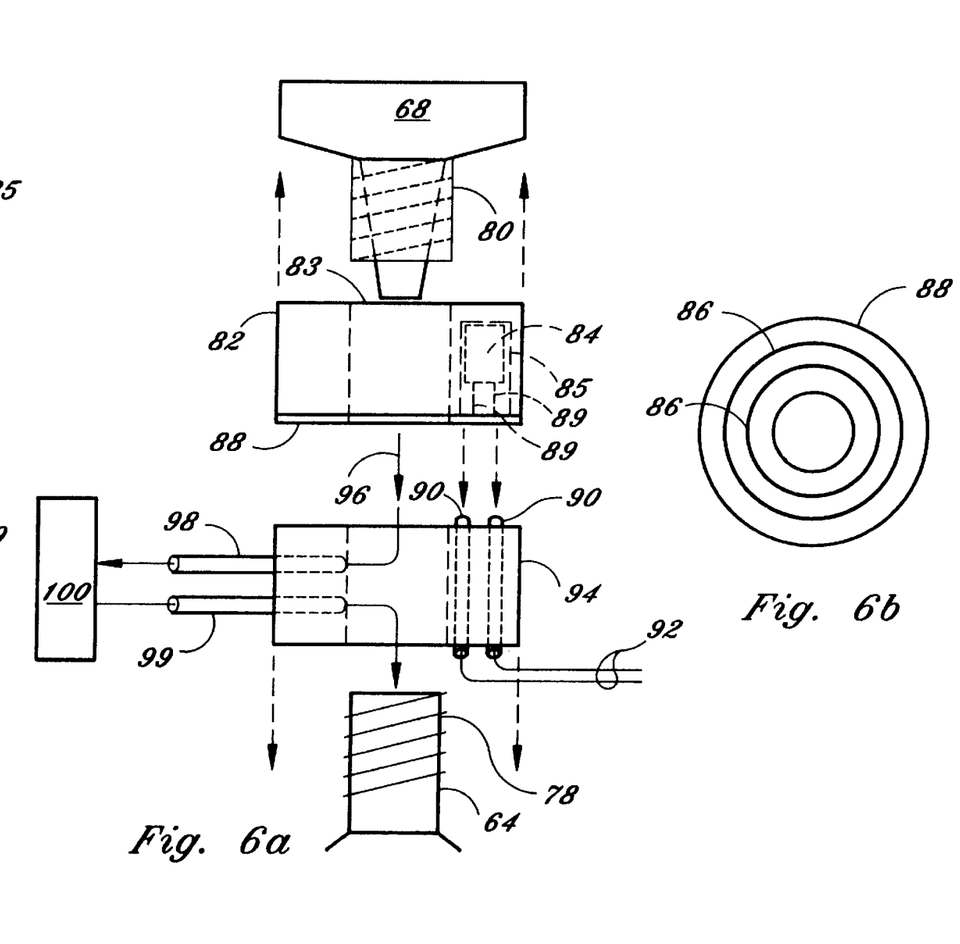
FIG. 6a is an exploded front elevational view of the syringe identification disk and mating injection port disk of the present invention.
FIG. 6b is a bottom plan view of the syringe identification disk.

Referring to FIG. 6a, the memory chip 84 is attached to disk base 88 which is a printed circuit board that contains two electrically conductive concentric rings 86, as shown in FIG. 6b, one connected to each pin 89 of chip 84. This allows syringe 68 to be oriented in any rotational position while making contact with two stationary pins 90 that are wired 92 to computer 16. Pins 90 are embedded into identification (ID) reader disk 94 that is attached to manifold port 64.

When the modified syringe 68 is placed onto the modified manifold 64, the computer 16 can read the contents of the memory chip 84 (preprogrammed) which contains the type of the drug simulated in the syringe 68 and the drug's concentration. Remaining syringes 69, 70, in FIG. 3, will each have a preprogrammed chip 84 in ID discs 82' and 82", read by ID reader disc 94' and 94", respectively, to simulate different drugs and different concentrations which will be monitored by computer 16.

As the simulated drug fluid (water or any suitable liquid) is manually pushed from the syringe 68 into the manifold port 64, the liquid flow 96 is diverted through flowmeter tap 98 in the lower disk 94 into flowmeter 100 prior to being returned to the disk 94 through flowmeter tap 99 and into the manifold 64, as shown in FIG. 6a. Each syringe 68, 69, and 70 will have a separate flowmeter to monitor its flow. Flowmeters for measuring fluid flow can include rotatable impellers, piston displacement sensors, electromagnetic sensors, and other known devices.

The computer 16 monitors the flow 96 of the fluid from each syringe 68, 69, and 70 and tracks the total amount of fluid transferred. The concentration and type of drug in the fluid is read from each syringe's memory chip 84, thus determining the total amount of drug injected. The drug flow information is passed to the patient physiological models 28 and drug models 26 in computer 16 for determining the proper real time mannequin response. As the injection flow 96 is terminated, the flow stops and computer 16, or personal computer 31, logs the drug injection (time, drug, concentration, and amount) for use in the physiological models and for later review by the instructor.

An alternate embodiment to measure liquid flow is to use a single flowmeter 75, shown in FIG. 3, at the output 76 of manifold 62, with individual flow switches (not shown) at each port 64, 65, and 66 to indicate to the computer 16 which syringe 68, 69, or 70 is currently being used. This is possible because on/off valves, or stopcocks 72, 73, and 74 on manifold 62 prevent two syringes being pushed at the same time.

As over 70 different types of drugs can be used in anesthesiology, the method of digitally encoding drug data in the syringe for simulation is less complex than attempting to identify the fluid itself through chemical or spectrographic means. It also requires the trainee to perform no additional steps other than the normal action of connecting the syringe and injecting the drug. The use of flowmeters provides accurate and instant measurement of the fluid being injected into the patient.

This system also provides additional "real-world" features such as allowing differing concentrations of the same drug, dynamic reprogramming of the syringe data, allowing syringes to be re-used during the training session possibly with different drugs, and also allows mixtures of multiple drugs in the same syringe by encoding multiple drug data fields in chip 84.

In an alternate embodiment, the present invention is utilized in an actual operating or emergency room to identify the type of drug, concentration, and quantity administered, and to log this data along with the time the drug was administered to a patient.

One method to determine the drug type and concentration, in the alternate embodiment for use in an actual operating or emergency room, is to conduct a quick response chemical or spectrographic analysis of the drug being administered at a suitable point during administration such as when the drug flows into a flowmeter (not shown but similar to flowmeter 100 shown in FIG. 6a).

Figure 7:
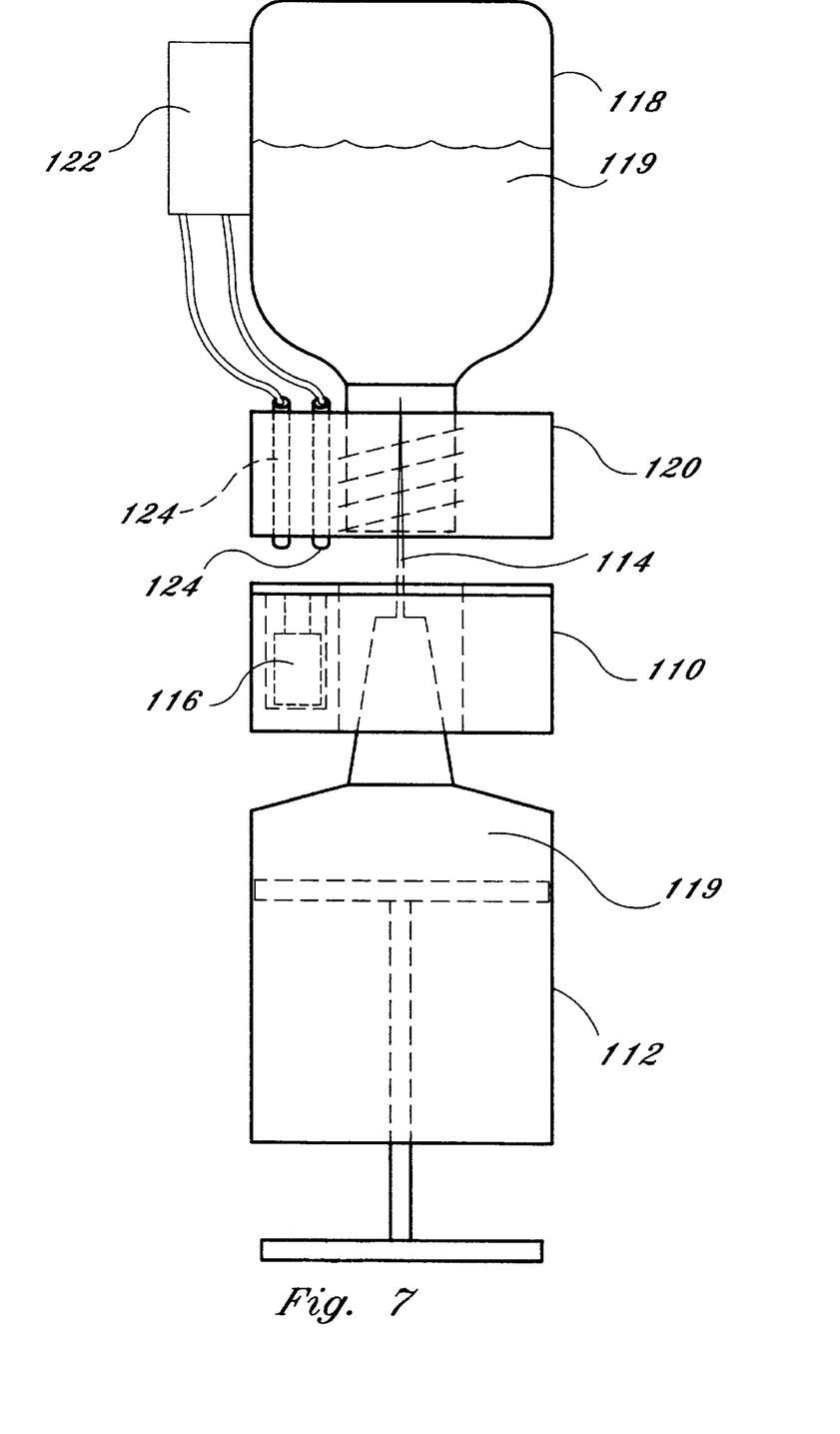
FIG. 7 is a front elevational view of an alternate embodiment of the present invention.

Referring now to FIG. 7, an alternate method to identify drug type and concentration is to provide disc 110 (similar to disc 82 shown in FIG. 6a), on each syringe 112 to be used in the operating or emergency room (similar to syringe 68 in FIG. 6a with a hollow needle 114 attached at the lower end). Each disc 110, can contain an IC chip 116 (similar to IC chip 84) which is reprogrammable, such as EEPROM or RAM. When syringe 112 is inserted into a bottle 118 containing a desired drug 119, IC chip 116 on disc 110 will be reprogrammed, with the drug 119 type and concentration, by a mating programming disc 120 provided on each bottle 118 containing a drug 119. Programmer 122 can be electrically connected by conductors 124 to chip 116 when discs 120 and 110 are mated together.

When drug 119 is administered, IC chip 116 will provide the drug type and concentration in a similar manner to that described herein above for administering simulated drugs. A flowmeter similar to that shown as 100 in FIG. 6a can be used to determine the quantity of drug administered.

Figure 8:
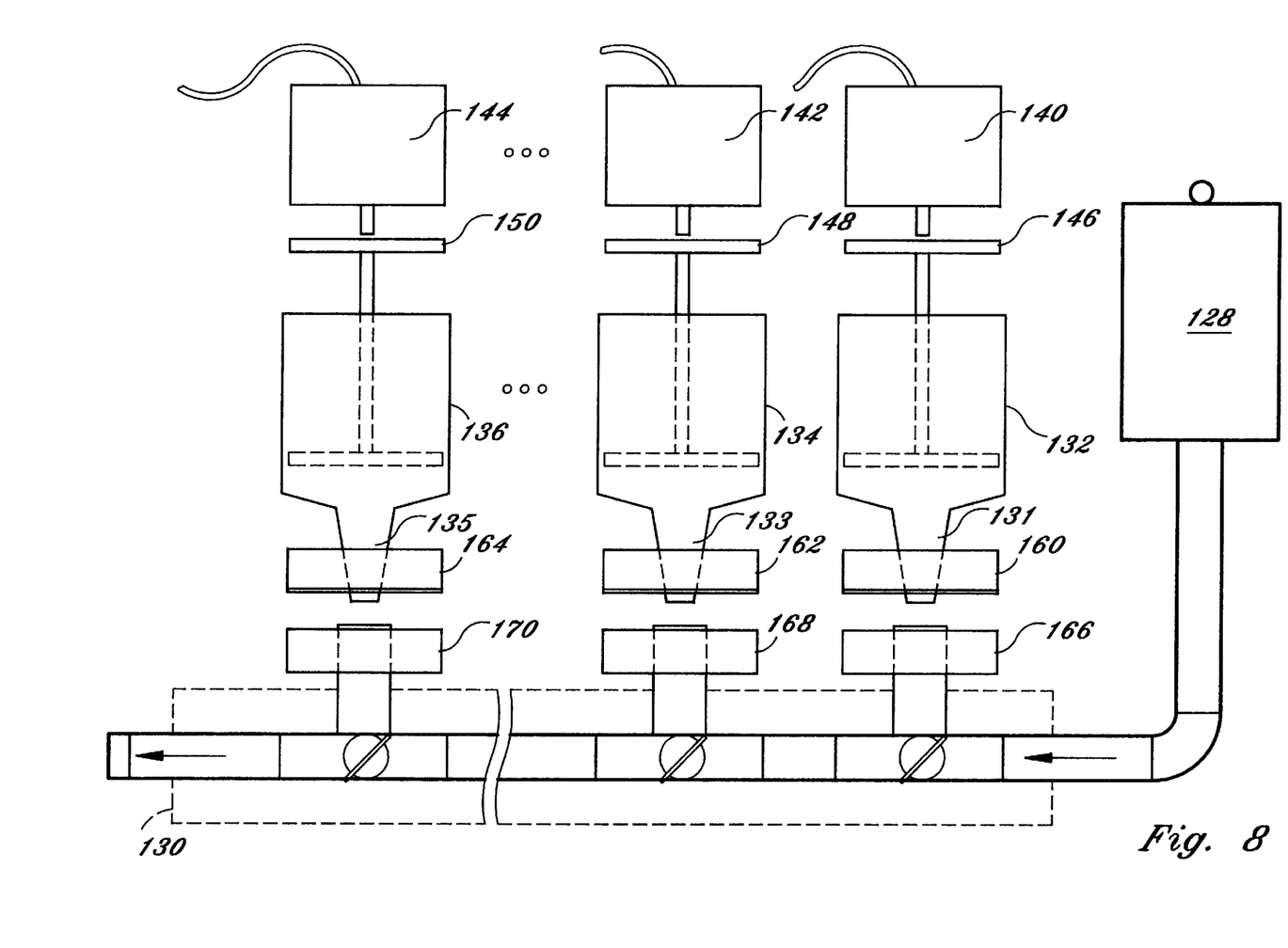
FIG. 8 is a front elevational view of an alternate embodiment of the present invention.

In yet another embodiment, the present invention can be used in conjunction with a device to automatically administer drugs to a patient. In this embodiment, as shown in FIG. 8, a manifold connected to an intravenous bag 128 (similar to manifold 62 shown in FIG. 3) is utilized along with any number of syringes 132, 134, and 136 (similar to syringes 68, 69, and 70 shown in FIG. 3) which contain actual drugs 131, 133, and 135. The computer identifies the type of drug contained in each syringe in the same manner according to the present invention and described herein above for identifying simulated drugs. ID discs 160, 162, and 164 each contain a memory disc, such as chip 116 described above, programmed appropriately for the drug and concentration contained in each syringe 132, 134, and 136 respectively. The data contained within the memory chip in each disc 160, 162, and 164 is read by ID reader disc 166, 168, and 170 respectively in the same manner described above.

The computer 16 monitors the patient's physiological status in a similar manner to that shown in FIGS. 1, 2a, and 2b, except the sensors are actual sensors monitoring a real patient. The computer monitors the patient's condition, and using programmed physiological models, determines the appropriate drug, concentration, and amount to administer.

Syringes 132, 134, and 136 can be activated by actuators 140, 142, and 144, to administer actual drugs. Actuators 140, 142, and 144 can be computer controlled, and administer drugs by depressing plungers 146, 148, and 150 of syringes 132, 134, and 136 respectively. The amount of drug administered can be monitored by flowmeter as described herein above, or measured by the known displacement of actuators 140, 142, and 144, depressing plungers 146, 148, and 150.

The computer can be initially be under the control of a physician, and can use physiological models and adaptive and expert systems programming to learn the proper drugs and dosages in response to patient symptoms.

Figure 9:
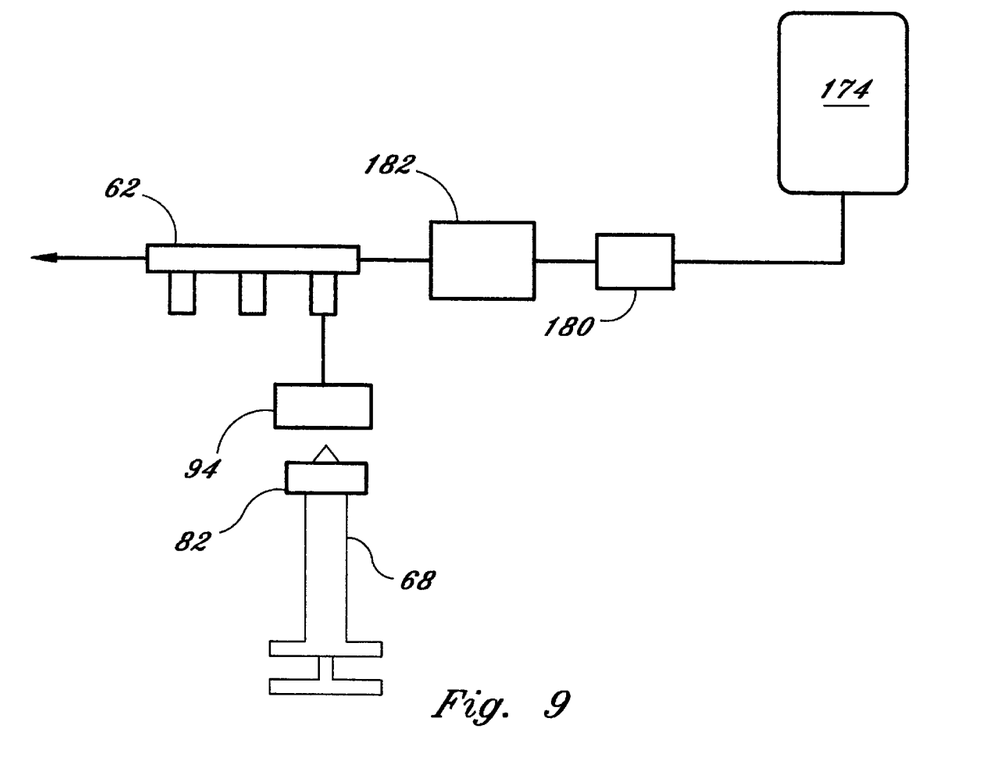
FIGS. 9, 10, and 11 are diagrammatic views of alternate embodiments of the present invention.
Figure 10:
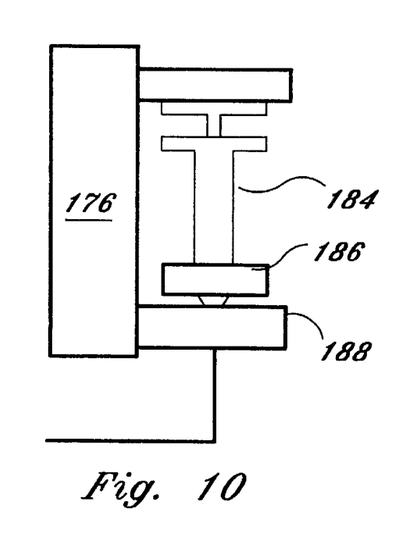
Figure 11:
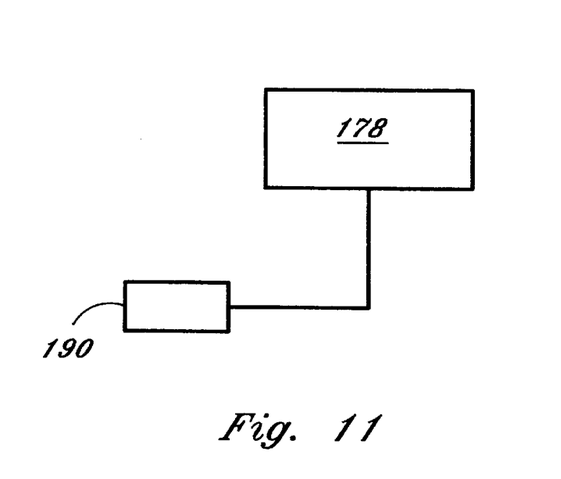

Referring now to FIGS. 9, 10, and 11, alternate embodiments of the present invention are shown for identifying the quantity, strength, and type of fluid administered by intravenous bag, syringe pump, or infusion pump. In FIG. 9, an intravenous (IV) bag 174 is connected to ID disc 180, which is similar to disc 82 described herein above. ID disc 180 is read by ID reader disc 182, which is similar to disc 94 described herein above. ID reader disc 182 can be connected to a syringe manifold, such as syringe manifold 62, as shown in FIG. 9, or alternately connected to a patient.

FIG. 10 shows a syringe pump 176 having attached a syringe 184 having an ID disc 186, similar to ID disc 82, and ID reader disc 188, similar to ID reader disc 94, which are described herein above. This embodiment can be used with an actual or simulated patient.

FIG. 11 shows an infusion pump 178 and attached ID disc 190, similar in operation to disc 82. Disc 190 would be read by an ID reader disc similar in operation to disc 94 described herein above, and utilized with an actual or simulated patient.

The instant invention has been shown and described herein in what it is considered to be the most practical and preferred embodiment. It is recognized, however, that departures may be made therefrom within the scope of the invention and that obvious modifications will occur to a person skilled in the art.

What is claimed is:

1. A patient simulator drug recognition apparatus comprising:
   at least one syringe means for injecting fluid;
   at least one means for measuring fluid flow in fluid communication with said at least one syringe;
   at least one electronic means for simulating a drug and simulating a drug concentration connected to said at least one syringe means;
   computer means for identifying said simulated drug and said simulated drug concentration, said computer means electrically connected and responsive to said electronic means for simulating;
   said computer means electrically connected to said means for measuring fluid flow, wherein said computer means identifies said simulated drug, said simulated drug concentration, and measures fluid flow of said simulated drug for said at least one syringe means.

2. The apparatus as claimed in claim 1 further including:
   a manifold means removably connected to said at least one syringe means, said manifold means in fluid communication with a container of intravenous fluid and in fluid communication with means for intravenous fluid input for a patient simulator;
   said means for measuring fluid flow in fluid communication with said manifold means.

3. The apparatus as claimed in claim 2 wherein there are a plurality of syringes connected to said manifold means and a plurality of electronic means for simulating a drug and a drug concentration, wherein one each of said electronic means for simulating a drug and a drug concentration is connected to one each of said plurality of syringes.

4. The apparatus of claim 3 wherein there are a plurality of means for measuring fluid flow, wherein one each of said means for measuring fluid flow is in fluid communication with one each of said plurality of syringes.

5. The apparatus of claim 1 wherein said computer means includes at least one physiological model and at least one drug model.

6. The apparatus of claim 5 wherein said computer means includes means for manual input.

7. The apparatus of claim 6 wherein said computer means generates a plurality of control signals for essentially real time patient simulator physiological responses.

8. The apparatus of claim 2 wherein said at least one electronic means is a preprogrammed memory integrated circuit, said integrated circuit being housed in a first disk shaped member;
   said first disk shaped member having a central aperture and a base;
   said first disk shaped member connected to said syringe means and having a first and a second electrical contact electrically connected to said integrated circuit, wherein said first and said second contacts are spaced apart concentric rings located on said base;
   a second disk shaped member connected to said manifold means, said disk shaped member having a central aperture and an upper portion;
   said second disk shaped member having a third and a fourth electrical contact located spaced apart on said upper portion, said third and fourth electrical contacts electrically connected to said computer means;
   wherein said third and fourth electrical contacts are electrically connected to said first and second electrical contacts by rotational engagement of said base of said first disk and said upper portion of said second disk.

9. The apparatus of claim 8 wherein said second disk includes;
   a first fluid flow tap in fluid communication with said syringe means through said aperture of said first disk, said first fluid flow tap in fluid communication with said at least one means for measuring fluid flow
   a second fluid flow tap in fluid communication with said at least one means for measuring fluid flow, and in fluid communication with said manifold means through said aperture of said second disk.

10. A patient drug recognition apparatus comprising:
    at least one syringe means for injecting a fluid;
    at least one means for measuring fluid flow in fluid communication with said at least one syringe means;
    at least one electronic means for identifying said fluid connected to said at least one syringe means;
    computer means for sensing said fluid, said computer means responsive to said electronic means for identifying;
    said computer means electrically connected to said means for measuring fluid flow, wherein said computer means identifies said fluid type, said fluid concentration, and amount of said fluid flow for said at least one syringe means.

11. The apparatus of claim 10 further including at least one means for programming connected to at least one container of fluid;
    said electronic means for identifying is reprogrammable and responsive to said at least one means for programming.

12. The apparatus of claim 10 further including a manifold means removably connected to said at least one syringe means, said manifold means in fluid communication with a container of intravenous fluid.

13. The apparatus of claim 12 further including means for automatically injecting said fluid from said at least one syringe means, said means for automatically injecting responsive to said computer means.

14. A patient drug recognition apparatus comprising:
    means for administering a liquid drug to a patient;
    means for electronically identifying said liquid drug connected to said means for administering a liquid drug, said means for identifying said liquid drug including at least one programmable identification IC associated with said liquid drug and with a concentration of said liguid drug and an identification ID reader for reading said identification IC to identify said liquid drug and said concentration of said liquid drug; and;

computer means for sensing said liquid drug, said computer means responsive to said means for electronically identifying said liquid drug; wherein said computer means identifies said liguid drug type and said liquid drug concentration for said means for administering a liguid drug.

15. The apparatus of claim 14 further including:

at least one means for measuring fluid flow in fluid communication with said at least one means for administering a liquid drug;

said computer means for sensing said liquid drug electrically connected to said means for measuring fluid flow, said computer means responsive to said means for measuring fluid flow, wherein said computer means measures the amount of said fluid flow.

* * * * *

UNITED STATES PATENT OFFICE
CERTIFICATE OF CORRECTION

PATENT NO. : 5,873,731
DATED : February 23, 1999
INVENTOR(S) : William K. Prendergast It is certified that error appears in the above-identified patent and that said Letters Patent is hereby corrected as shown below:

Claim 14, Column 11, Line 2, please delete liguid and insert liguid.

Claim 14, Column 11, Line 9, please delete liguid and insert liguid.

Claim 14, Column 11, Line 11, please delete liguid and insert liguid.

Signed and Sealed this

Twenty-fourth Day of August, 1999

Attest:

Q. TODD DICKINSON

*Attesting Officer*  *Acting Commissioner of Patents and Trademarks*